(12) United States Patent
Ferlitsch et al.

(10) Patent No.: US 7,800,774 B2
(45) Date of Patent: *Sep. 21, 2010

(54) SYSTEMS AND METHODS FOR BOOK PRINTING THROUGH USE OF BOOKLET GANGING

(75) Inventors: Andrew R. Ferlitsch, Camas, WA (US); James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 306 days.

This patent is subject to a terminal disclaimer.

(21) Appl. No.: 12/024,876

(22) Filed: Feb. 1, 2008

(65) Prior Publication Data
US 2008/0123140 A1 May 29, 2008

Related U.S. Application Data

(63) Continuation of application No. 10/404,582, filed on Mar. 31, 2003, now Pat. No. 7,349,113.

(51) Int. Cl.
*G06F 15/00* (2006.01)
*G06F 15/16* (2006.01)
(52) U.S. Cl. .................................... 358/1.15; 709/203
(58) Field of Classification Search ................ 358/1.15, 358/1.16, 1.18, 1.12, 1.13, 296, 1.14; 719/327, 719/328; 715/524, 517; 713/193, 189; 709/203, 709/208, 220; 435/325, 326
See application file for complete search history.

(56) References Cited

U.S. PATENT DOCUMENTS

| | | | |
|---|---|---|---|
| 5,398,289 A | 3/1995 | Rourke et al. | |
| 5,995,723 A | 11/1999 | Sperry et al. | |
| 6,099,225 A | 8/2000 | Allen et al. | |
| 6,215,487 B1 | 4/2001 | Barrett et al. | |
| 6,426,798 B1 | 7/2002 | Yeung | |
| 7,349,113 B2 * | 3/2008 | Ferlitsch et al. | 358/1.15 |
| 2001/0051964 A1 * | 12/2001 | Warmus et al. | 707/530 |
| 2002/0069228 A1 * | 6/2002 | Mori et al. | 707/524 |
| 2004/0085572 A1 * | 5/2004 | Gomez | 358/1.15 |

FOREIGN PATENT DOCUMENTS

| | | |
|---|---|---|
| EP | 0945779 | 9/1999 |
| EP | 1100002 | 2/2003 |
| JP | 2002200814 | 7/2002 |
| WO | 0025259 | 5/2000 |

* cited by examiner

*Primary Examiner*—Saeid Ebrahimi Dehkordy
(74) *Attorney, Agent, or Firm*—Austin Rapp & Hardman

(57) ABSTRACT

A system for printing a book through use of booklet ganging is disclosed. The system includes a computer connected to a printer. A document is accessible on the computer and is compatible with an application running on the computer. The system includes a software component that is configured to obtain a style configuration after a print command has been executed by the application. The style configuration includes an indication of whether the document is to be ganged. The style configuration is not obtained by the application. The software component gangs booklets based on the style configuration if the indication indicates that the document is to be ganged. The book is then printed through use of the booklet ganging.

17 Claims, 12 Drawing Sheets

SYSTEMS AND METHODS FOR BOOK PRINTING THROUGH USE OF BOOKLET GANGING

CROSS-REFERENCE TO RELATED APPLICATIONS

This application is a continuation of U.S. patent application Ser. No. 10/404,582 entitled "Systems and Methods for Book Printing Through Use of Booklet Ganging," filed Mar. 31, 2003, now U.S. Pat. No. 7,349,113, which is hereby incorporated by reference in its entirety.

TECHNICAL FIELD

The present invention relates generally to printing through use of a computer. More specifically, the present invention relates to systems and methods for book printing through use of booklet ganging.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Different kinds of computer software facilitate the printing of materials through use of a printer. The computer or computing device that will be used to print the materials typically has one or more pieces of software running on the computer that enable it to send the necessary information to the printer to enable printing of the materials.

The materials that are printed are sometimes meant to simply be on one or more pages. However, sometimes materials are printed that are meant to be put together. For example, pamphlets, booklets and books are all examples of materials that are put together in some way after the actual pages are printed. Sometimes special software is required for certain printing jobs. If this is the case and a user does not have the software required, he or she may not be able to produce the desired materials. Benefits may be realized by a providing increased functionality to the software available on a computer system such that specialized software for printing certain materials is not required.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
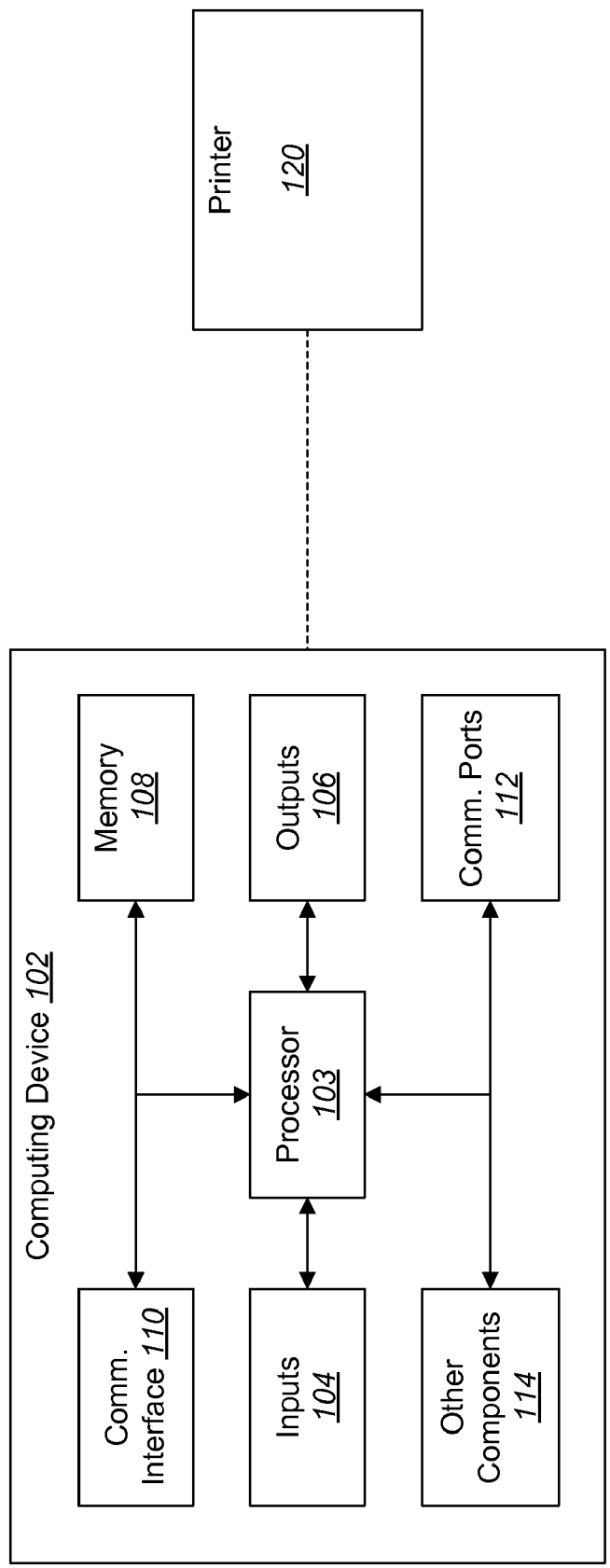
FIG. 1 is a block diagram illustrating the major hardware components typically utilized in a computing device used with embodiments herein.

A system for printing a book through use of booklet ganging is disclosed. The system includes a computer connected to a printer. A document is accessible on the computer and is compatible with an application running on the computer. The system includes a software component that is configured to obtain a style configuration after a print command has been executed by the application. The style configuration includes an indication of whether the document is to be ganged. The style configuration is not obtained by the application. The software component gangs booklets based on the style configuration if the indication indicates that the document is to be ganged. The book is then printed through use of the booklet ganging.

In an embodiment of the system, the printer may comprise a facsimile device and the print command may comprise a print/fax command. Further, the software component may comprise a printer driver or a fax driver.

The software component may be embodied in various forms. For example, the software component may comprise a print processor, a spooler, a port manager or a print assist.

A method for printing a book through use of booklet ganging is also disclosed. An application is used on a computing device to process a document that comprises a book. A print command is executed. Then a style configuration is obtained after the print command is executed, where the style configuration includes an indication of whether the document is to be ganged, and where the style configuration is not obtained by the application. Then booklets are ganged based on the style configuration if the indication indicates that the document is to be ganged. Finally the book is printed through the use of the booklet ganging. A menu may be displayed that allows the style configuration to be obtained.

The style configuration may be obtained by various program instructions including, but not limited to, printer driver instructions, fax driver instructions, print processor instructions, print assist instructions, port manager instructions and spooler instructions.

Pages of the book may be assembled after printing instructions are passed through a Graphical Device Interface (GDI). Each booklet may be treated as separate Raster Image Processed (RIP) data.

Booklet ganging may be specified for book printing. Further, booklet groupings may be specified. In addition, a Raster Image Processed (RIP)/assembly may be generated per booklet for printing.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

It will be readily understood that the components of the embodiments as generally described and illustrated in the Figures herein could be arranged and designed in a wide variety of different configurations. Thus, the following more detailed description of various embodiments of the present invention, as represented in the Figures, is not intended to limit the scope of the invention, as claimed, but is merely representative of the embodiments of the invention.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is a block diagram illustrating the major hardware components typically utilized with embodiments herein. The systems and methods disclosed may be used with a computing device 102 and a printer 120. Computing devices 102 are known in the art and are commercially available. The major hardware components typically utilized in a computing device 102 are illustrated in FIG. 1. A computing device 102 typically includes a processor 103 in electronic communication with input components or devices 104 and/or output components or devices 106. The processor 103 is operably connected to input 104 and/or output devices 106 capable of electronic communication with the processor 103, or, in other words, to devices capable of input and/or output in the form of an electrical signal. Embodiments of devices 102 may include the inputs 104, outputs 106 and the processor 103 within the same physical structure or in separate housings or structures.

The electronic device 102 may also include memory 108. The memory 108 may be a separate component from the processor 103, or it may be on-board memory 108 included in the same part as the processor 103. For example, microcontrollers often include a certain amount of on-board memory.

The processor 103 is also in electronic communication with a communication interface 110. The communication interface 110 may be used for communications with other devices 102. Thus, the communication interfaces 110 of the various devices 102 may be designed to communicate with each other to send signals or messages between the computing devices 102.

The computing device 102 may also include other communication ports 112. In addition, other components 114 may also be included in the electronic device 102.

Of course, those skilled in the art will appreciate the many kinds of different devices that may be used with embodiments herein. The computing device 102 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 1 is only meant to illustrate typical components of a computing device 102 and is not meant to limit the scope of embodiments disclosed herein.

The computing device 102 is in electronic communication with the printer 120. Printers 120 are commercially available and known by those skilled in the art.

Figure 2:
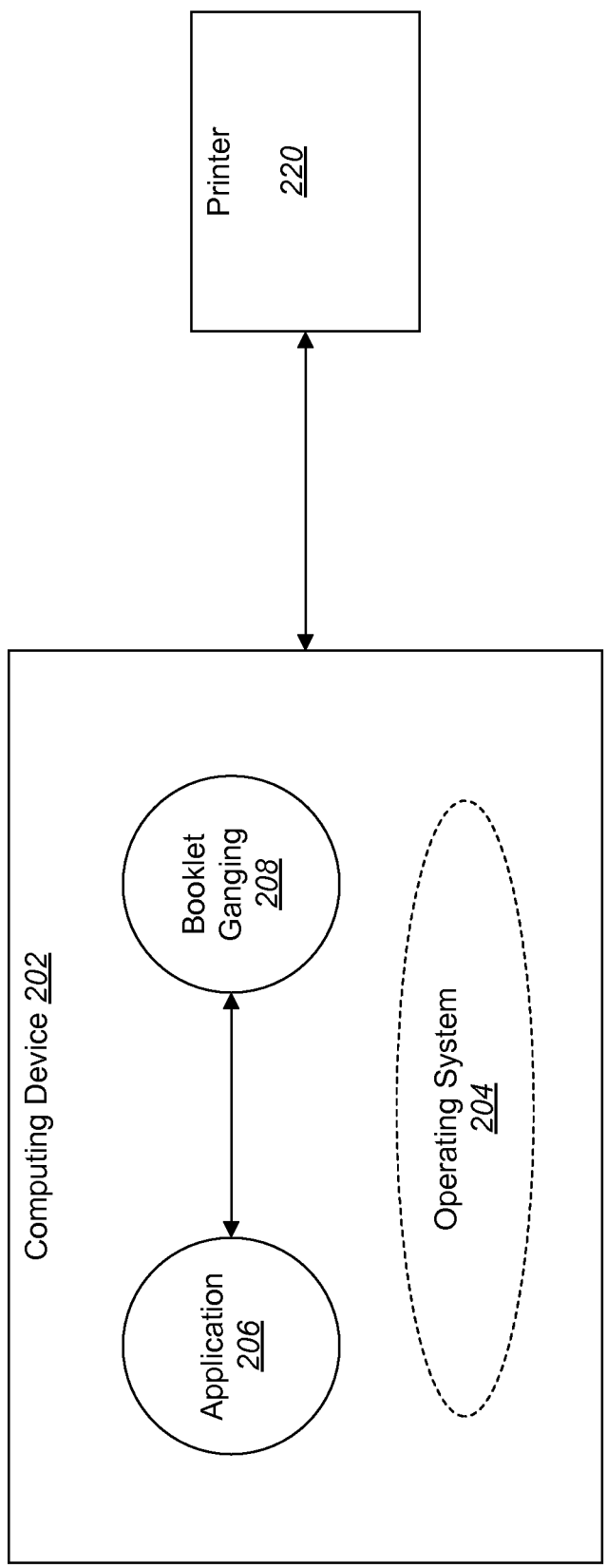
FIG. 2 is a context diagram for the software used in combination with the hardware of FIG. 1.

FIG. 2 is a software block diagram to provide a context for the systems and methods herein. The computing device 202 is in electronic communication with the printer 220. Usually the computing device 202 includes an operating system 204. An application 206 is present on the computing device 202. Typically there are many applications 206 on a computing device 202.

The systems and methods disclosed herein provide a book printing via booklet ganging software component 208 that facilitates the printing of books through the use of booklet ganging that takes place in between application-level processing and a printer 220. The booklet ganging software component 208 operates to facilitate printing a book consisting of multiple booklets on a digital printing device from a single print invocation.

Various embodiments of the booklet ganging software component 208 will be described and illustrated below. The application 206 and the booklet ganging software component 208 may be implemented in various ways, including embodiments where one or both of these software components are part of the operating system 204 or where one or both of these software components are not part of the operating system 204.

Printers 220 are used to print a variety of items including documents, pictures, cards, etc. Printers 220 may be used to print booklets. A booklet may be described as several sheets of paper that are laid on top of each other and folded down the vertical center. A page of the booklet is printed on each side of the folded paper (i.e., ½ side of sheet) on both front and back (i.e., duplex). The pages are laid out in booklet order such that the pages appear in sequential page order from the front ½ side of the first folded sheet (i.e., 1st page) to the back ½ side of the first folded sheet (e.g., last page).

Typically, a book consists of multiple booklets that are bound together to form a single book. Generally, books are produced on offset printers and mechanically assembled in offline finishing step.

On a digital imaging printing device, print jobs are printed and assembled by options selected in an associated printer driver, rendered on the client side and/or printer firmware and assembled by an attached finishing device to the digital printer.

Traditionally, the printer drivers and printer firmware support the concept of printing a booklet, but not the concept of a sequence of booklets (i.e., booklet ganging), which are then assembled into a single bound output (i.e., book). For example, most printer drivers display an option (e.g. document style) which typically allow the user to select one of the following mutually exclusive assembly options: (1) simplex printing, (2) duplex printing w/binding on short edge, (3) duplex printing with binding on long edge, and (4) booklet printing.

Booklet printing is generally selected to print what is commonly called a pamphlet. For example, if one wanted to print 100 pamphlets of an 8-page document, one generally would select booklet printing and set the number of copies to 100. In this example, the 8 pages would be laid out in booklet order, one per ½ side of a sheet, onto two sheets (i.e., 4 pages per sheet), printed, folded down the vertical center and stapled on the fold (i.e., saddle stitch). The printer 220 would repeat the above process 100 times for the number of copies specified.

While this method described is typically good for a pamphlet of a small number of sheets, it usually does not perform as well on a large number of sheets. For example, a 200-page document as a single booklet would be laid out onto 25 sheets. As each sheet is laid on top of the next, the thickness of the fold increases and eventually makes the pamphlet unmanageable.

Currently booklet printing is supported in the print subsystem of the Microsoft Windows 2000 operating system without the support of the rendering in the printer driver or firmware. In this example, the user selects booklet printing from the printer driver and EMF (Enhanced Metafile Format) spooling. The printer driver then journals the printing instructions and spools the journaled print data back to the spooler. The spooler, immediately or delayed, despools the print data to the print processor associated with the port of the installed printer.

If the print processor is the default Windows 2000 print processor (i.e., winprint), the print processor will use built-in GDI functions to scale, place and reorder the pages in EMF format into a booklet sequence. The EMF data is then played back to the respective printer driver. The printer driver then renders the journaled data and spools the rendered data to the Spooler.

While this is an improvement, there is no support for booklet ganging (i.e., sequence of multiple booklets in sequential page order), legacy Windows operating systems (i.e., Win95/98/Me and WinNT), and/or printer drivers that do not support EMF mode printing. If one desires to print a book using a digital imaging printer, typically a special proprietary application is required upstream from the printer driver.

In this case, the document(s) are imported into an application that either supports the document format of the document or the document is converted to the application specific format. The pages of the document can then be perused individually or by groups. SharpDesk® from Sharp Corporation is an example of an application that supports the above.

Once the pages are imported into the application, the application would support the capability to assemble pages. In the case of a book, the user might be able to group pages into a sequence of booklets. This might be done via a cursor operation or a menu operation.

When the user chooses to print, the application would produce a print job where each booklet is a separate RIP, vs. where the entire document is a single RIP. RIP stands for Raster Image Processor. A RIP is a process that takes PDL (Page Description Language) page data and converts it into a bitmap for printing. Each RIP would specify the correct sequencing of pages in the booklet and specify the appropriate finishing options (e.g., folding and saddle stitch).

This method supports printing a book on a digital imaging printer. However, it suffers in that document formats are not supported by the book printing application. In addition, the document format native application options may not be supported in the book printing application. This also may require a special application that does not work within existing document and print subsystems.

The booklet ganging software component 208 may be used to provide many improvements. Through use of the book printing via booklet ganging software component 208, the printing of a book may be application independent where no special booklet printing application is required. The printing of a book may also be independent of the document format because the assembling of pages occurs downstream in the print subsystem after the printing instructions are passed through GDI. Through use of the book printing via booklet ganging software component 208, the printing of a book may be transparent to the print subsystem (i.e., can be printed within existing print subsystems). When the component 208 is implemented downstream from the printer driver, such as in the print processor or spooler, the printing of a book may be printer driver independent.

The book printing via booklet ganging software component 208 is implemented such that it processes a document between an application 206 and a printer 220. For example, it may be implemented as a printer driver, a spooler, a print processor, a print assist, a port monitor, a printing device, a print server, and the like. The system results in printing a book that consists of multiple booklets bound together. The system has the advantage of working in pre-existing print subsystems, such as within the Microsoft Windows® family of operating systems, and does not require a special document assembly application.

The systems and methods disclosed herein enable the printing of a book on a digital printer to be independent of the document formats of the pages and independent of the method of initiating the print job. For example, the pages may be in Microsoft Word® format. A user may initiate a print job by opening the document via Microsoft Word® and selecting File-Print from Microsoft Word's main menu. The user would then select the appropriate installed printer from the print menu and the application would generate printing instructions per page in a normal (i.e., sequential) page order. The printing instructions are sent to a Graphical Device Interface (GDI) which then converts the instructions from GDI format to DDI (Device Driver Interface) format and passes them onto the printer driver associated with the selected installed printer.

The booklet ganging software component 208 may be implemented in various ways, as mentioned above. For example, it may be print driver based or it may be print processor based. The following discusses book printing via booklet ganging that is print driver based. In the following embodiments, the print driver has the capability to specify booklet ganging for book printing, specify the grouping of booklets and generate a RIP/assembly per booklet for printing.

Figure 3:
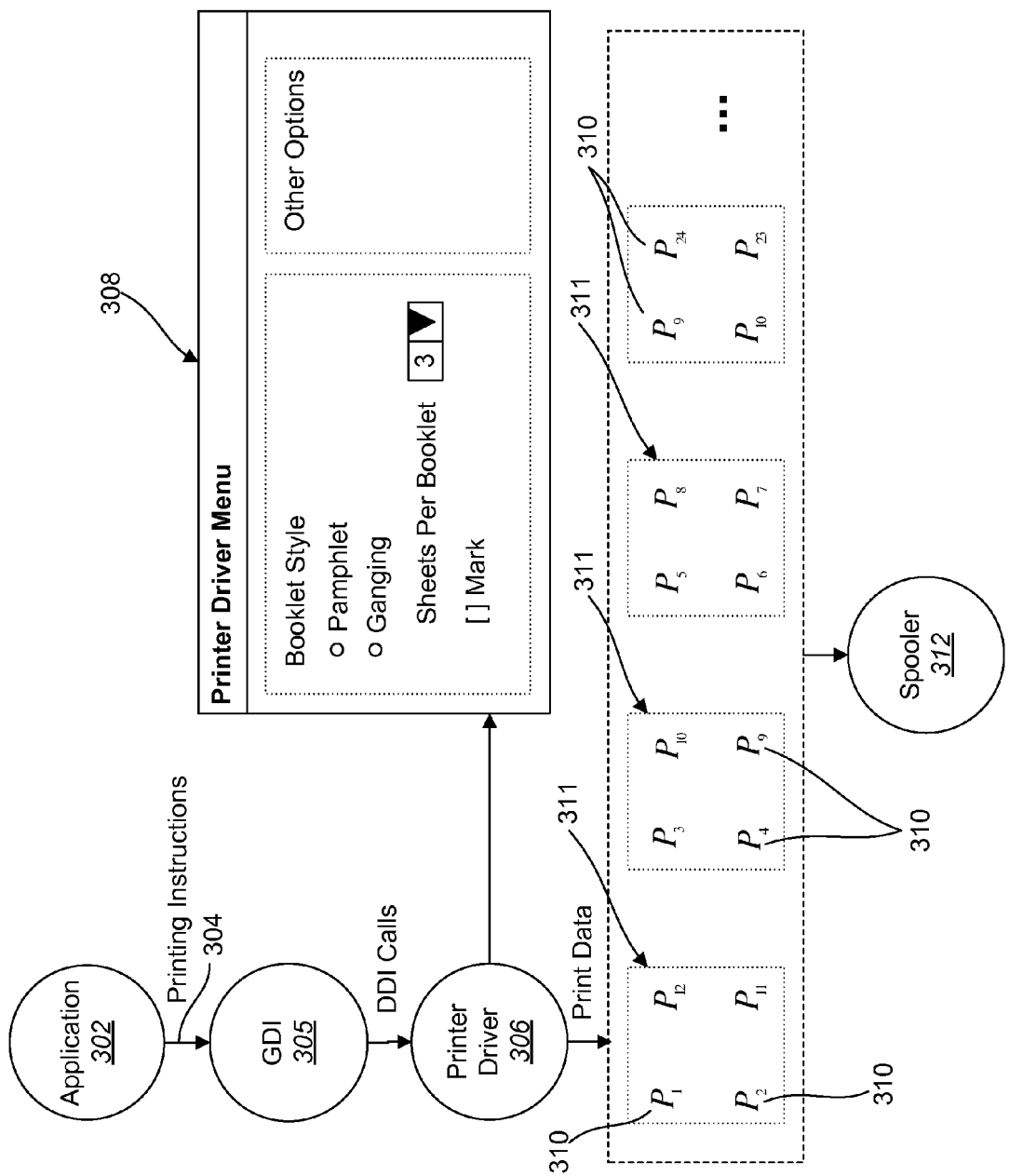
FIG. 3 is a block diagram illustrating an embodiment of a booklet ganging software component that is printer driver based.

FIG. 3 is a block diagram illustrating an embodiment of a booklet ganging software component 208 that is print driver based with fixed sized sets. In this embodiment, the application 302 sends the printing instructions 304 to the printer driver 306 associated with the selected printer.

The Graphical Device Interface (GDI) 305 may process the printing instructions 304 and send DDI calls to the printer driver.

The printer driver 306 may display a printer driver menu 308. The printer driver menu 308 may be displayed before (prior to sending the printing instructions), during (as the printing instructions are sent) and/or after (after the printing instructions are sent).

From the printer driver menu 308, the user selects booklet ganging as the document style assembly option. The user may then select the grouping of pages 310 ($P_1$, $P_2$, $P_3$, etc.), into booklets. There are a number of ways in which the user may select the grouping of pages 310 into booklets 311.

Some ways in which the user may select the grouping of pages 310 into booklets are described herein. However, those skilled in the art will appreciate that there are other ways to select the grouping of pages 310 into booklets. The number of sheets per booklet may be a fixed size or it may be a variable size. If the number of sheets per booklet is a fixed size, the user may enter the number of sheets per booklet, as shown in FIG. 3 in the printer driver menu 308. If the number of sheets per booklet is a variable size, the user may mark the boundaries of each booklet, such as by marking the lead page (i.e., front ½ side of folded sheet), as will be shown in FIG. 4. A spooler 312 may spool the print data.

The menu 308 shown in FIG. 3 is only one possible embodiment of a menu 308. There may be additional options, features, etc., displayed in the menu 308. For example, the user may select other booklet ganging options, such as, but not limited to the left ½ inside placement of plates or chapter inserts.

Embodiments herein may also operate without a user interface or menu. For example, in another embodiment, the printer driver 306 may be non-interactive. In the non-interactive printer driver the selection of booklet ganging and booklet grouping may be obtained by, a background process, pre-configured settings, and the like. Those skilled in the art will appreciate that there are many additional ways in which the method for book printing via booklet ganging may be configured.

Figure 4:
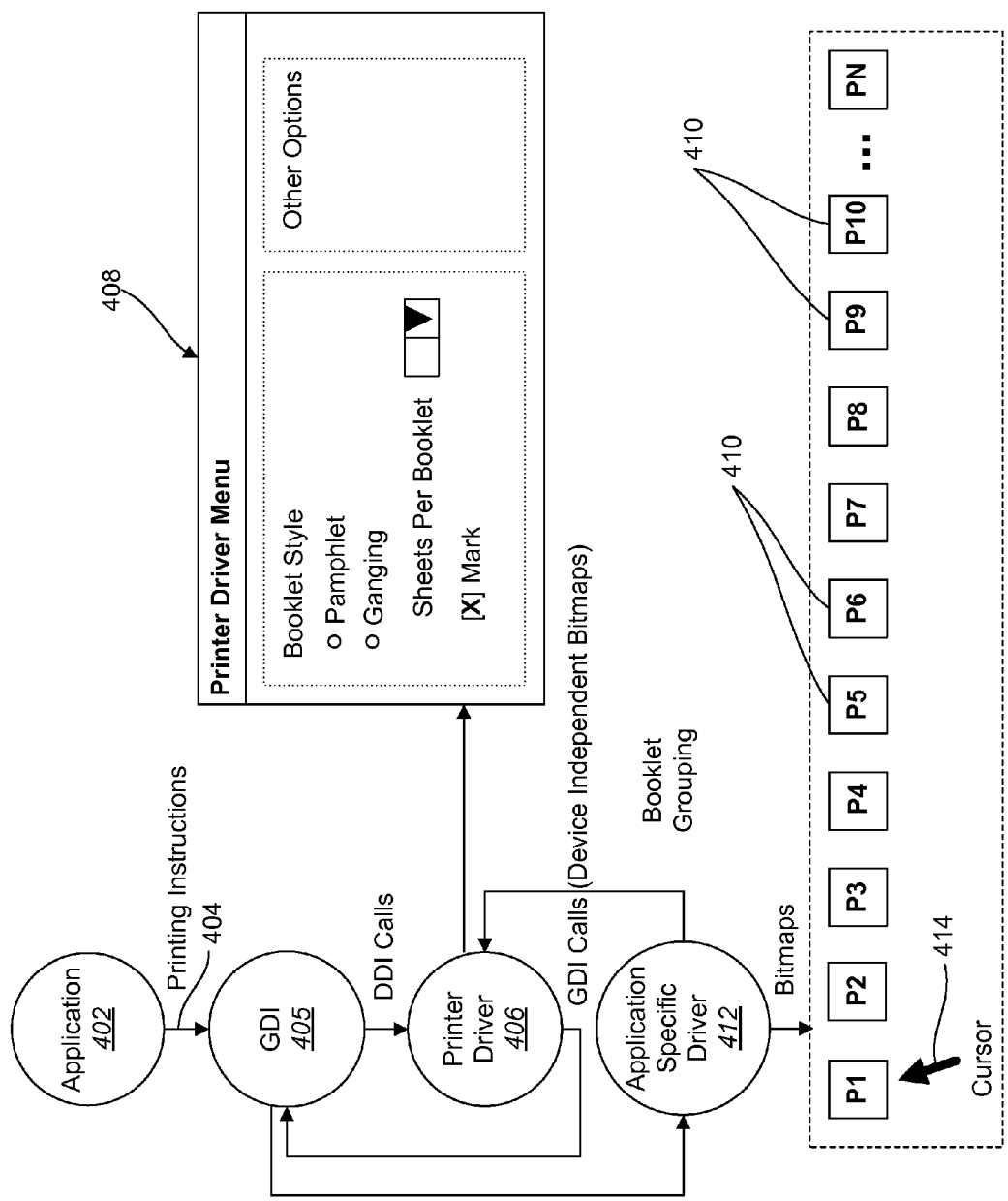
FIG. 4 is a block diagram illustrating another embodiment of a booklet ganging software component that is printer driver based.

FIG. 4 is a block diagram illustrating an embodiment that is printer driver based with variable sized sets. The application 402 sends the printing instructions 404 to the printer driver 406 associated with the selected printer. The GDI 405 may process the printing instructions 404 and send DDI calls to the printer driver.

The printer driver 406 may display a printer driver menu 408. The printer driver menu 408 may be displayed before (prior to sending the printing instructions), during (as the printing instructions are sent) and/or after (after the printing instructions are sent).

If the selection of grouping is variable size and the selection of options is interactive, the printer driver 406 could display a preview of the pages. In this embodiment, the user may select a preview option (not shown) from the printer driver 406. In one method to produce preview pages, the printer driver 406 may then convert the printing instructions in DDI format back to GDI format and play back the GDI printing instructions to GDI with the context of a display device (e.g., computer monitor or logical display application).

In this embodiment with the variable size grouping, the printer driver 406 may support a print preview option and play back the printing instructions to a display device. In this case, the display device is a logical display application 412 (e.g., an application specific driver) associated with the booklet ganging printer driver 406. The logical display application 412 may include, but is not limited to, a logical display driver for converting the printing instructions into a format compatible with the logical display application. The logical display application may implement a method for the logical display driver or application to import the converted printing instructions.

In another embodiment of the logical display application 412, the application may display the pages as full or reduced images, or it may display the pages in another full or reduced content identifying format. The logical display application 412 may allow the user to interactively select the grouping of booklets, such as by graphical means (e.g., point and click with the cursor 414).

Once the grouping of booklets is determined, the logical display application 412 may export the booklet grouping information back to the booklet ganging printer driver 406. The printer driver 406 may then reassemble the pages into booklet ordering for the specific booklet grouping. The printer driver 406 may then render the pages into printer ready data for booklet printing. Each booklet would be treated as a separate RIP. For example, the print data output for a 2 booklet print job in pseudo format may be as follows:

Start Print Job
 Start RIP
 Set Booklet Printing
 Set Folding
 Set Stapling
 Set Other Job Options
 Print Data for 1st Booklet
 End RIP
 Start RIP
 Set Booklet Printing
 Set Folding
 Set Stapling
 Set Other Job Options
 Print Data for 1st Booklet
 End RIP
 End Print Job In another method, each RIP may be a separate print job.

Figure 5:
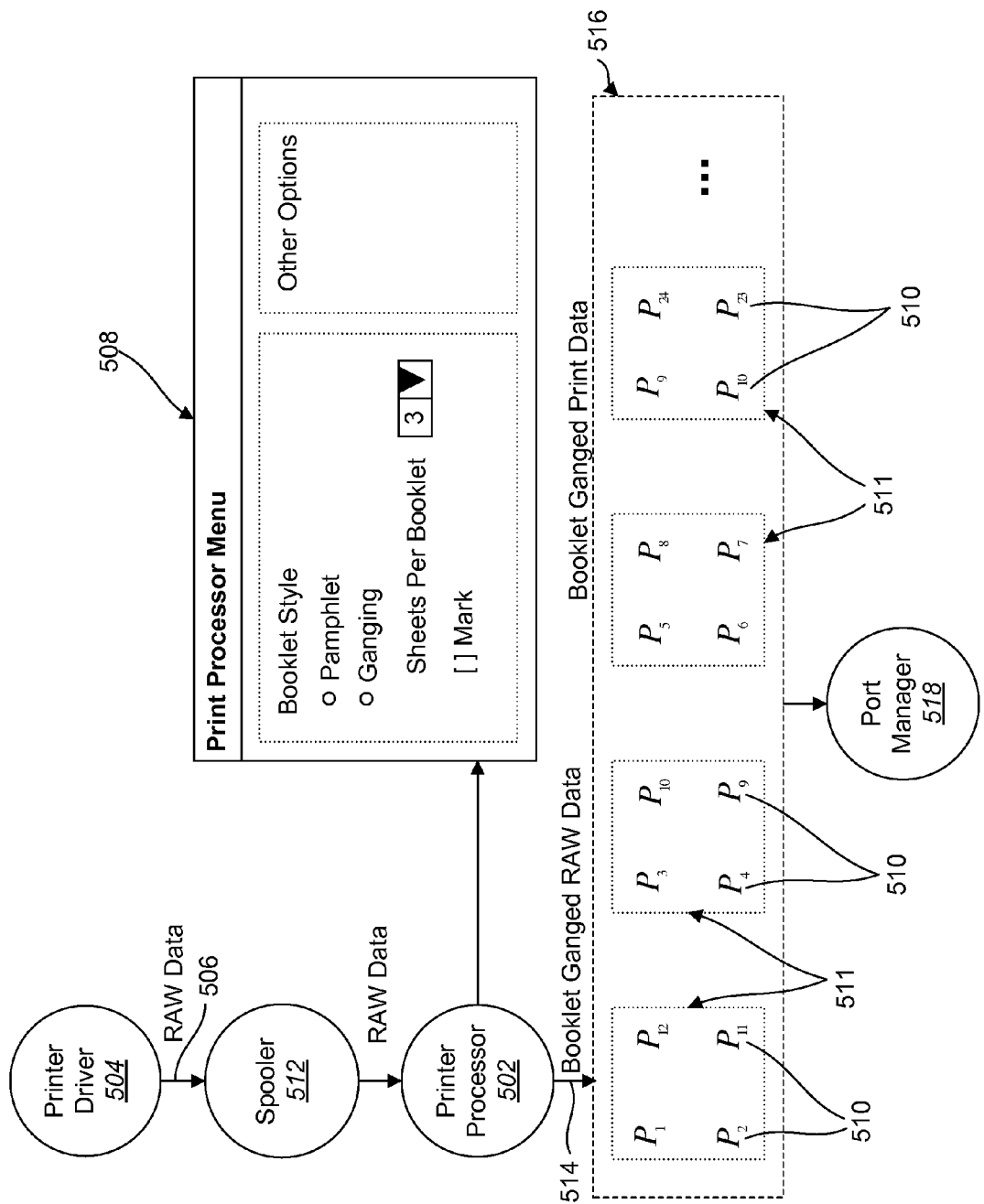
FIG. 5 is a block diagram illustrating an embodiment of a booklet ganging software component that is print processor based.

As mentioned above, the booklet ganging software component 208 may be embodied in a variety of different software or hardware components. For example, it may be print driver based, print processor based, spooler based, etc. FIG. 5 is a block diagram illustrating an embodiment of book printing via booklet ganging that is print processor based with fixed sized sets. In addition, the embodiment shown in FIG. 5 is for RAW mode, which is explained further below.

In this embodiment, the print processor 502 associated with the selected printer has the capability to specify booklet ganging for book printing, specify the grouping of booklets and/or to generate a RIP/assembly per booklet for printing.

The print processor 502 may also display a print processor menu 508 for selecting booklet ganging and booklet grouping options, as described above. In another embodiment, the print processor is non-interactive, and the selection of booklet ganging and booklet grouping is obtained by the methods described above.

In the embodiment shown in FIG. 5, the printer driver 504 may provide printer ready data. In one method of this embodiment, the print data has been rendered into printer ready data, hereafter referred to as RAW data 506. RAW data 506 is data that is in a format compatible as input to the printing device. Typically, RAW data 506 is either rasterized or in a Page Description Language (PDL) format, such as PCL, Postscript and PDF. A spooler 512 processes the RAW data 506.

The print processor 502 provides booklet ganged RAW data 514. The booklet ganged RAW data 514 comprises the booklet ganged print data 516 that is provided to the port manager 518.

If the selection of grouping is variable size and the selection of options is interactive, the print processor could display a preview of the pages. A variable sized sets embodiment is shown in FIG. 6.

Once the grouping of booklets 511 is determined, the print processor 502 would reassemble the pages into booklet ordering for the specific booklet grouping. Each booklet 511 would be treated as a separate RIP, as described earlier. The booklet ganged print data would then be de-spooled to the port manager 518 for printing to the printing device or saved as a print data file for deferred printing.

Figure 6:
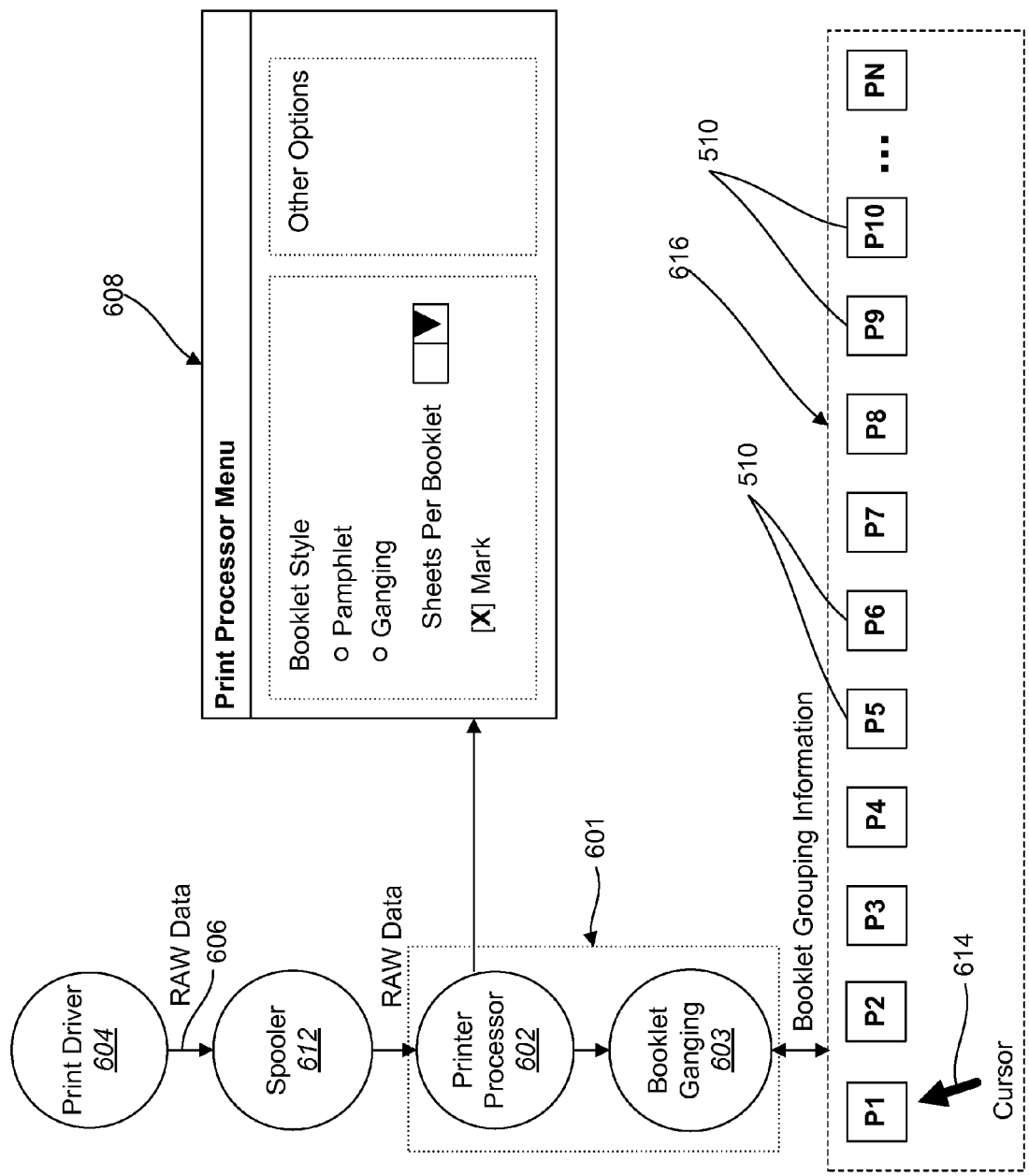
FIG. 6 is a block diagram illustrating another embodiment of a booklet ganging software component that is print processor based.

FIG. 6 is a block diagram illustrating an embodiment of a booklet ganging software component 208 that is print processor based with variable sized sets. The embodiment shown in FIG. 6 is also for RAW mode, explained above. The embodiment of FIG. 6 may operate similarly to the embodiment shown in FIG. 5 except that a booklet ganging process 603 has been broken out from the print processor 602. The functionality 601 of the print processor 602 and booklet ganging process 603 of FIG. 6 is similar to the functionality of the print processor 502 in FIG. 5.

Figure 7:
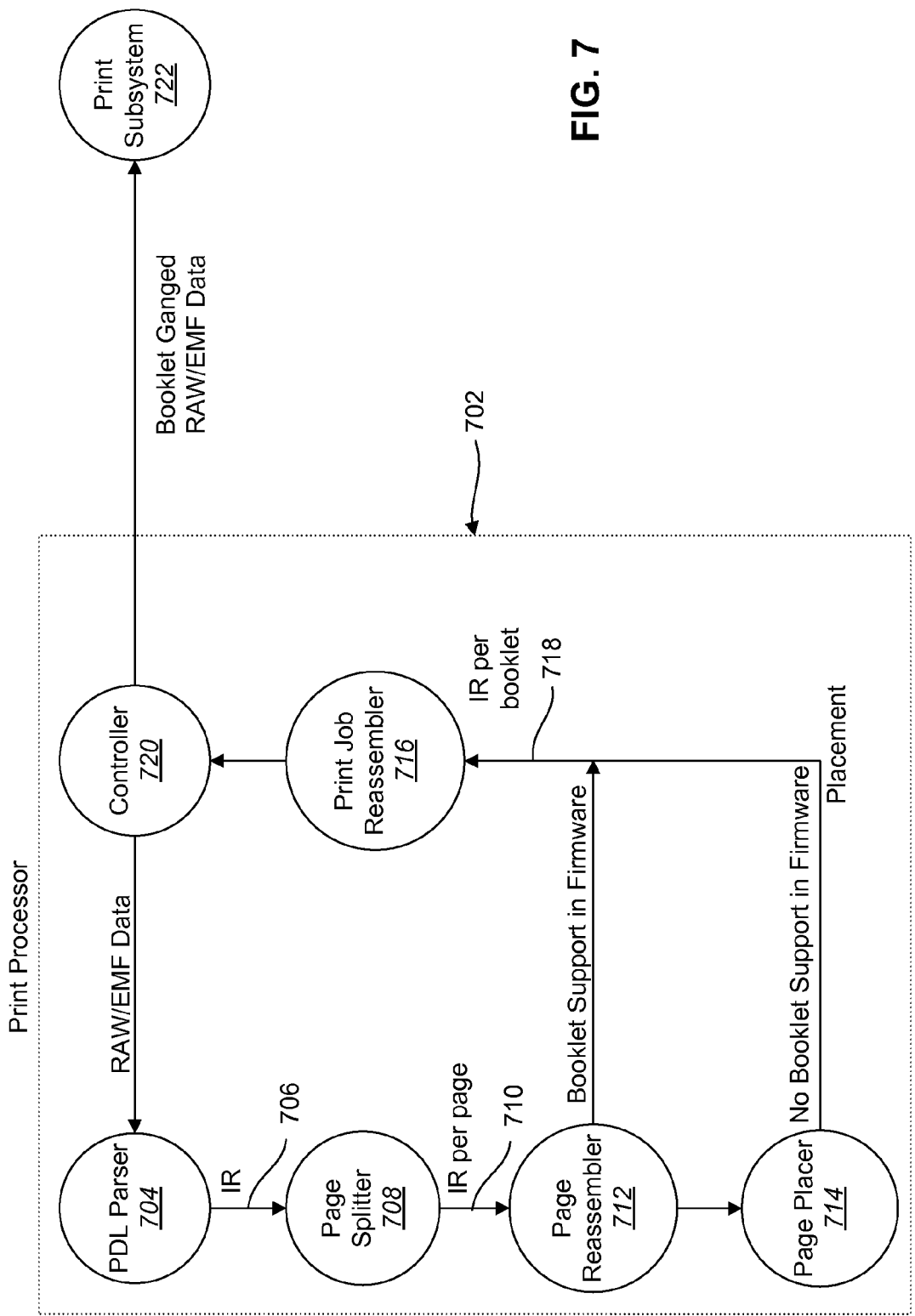
FIG. 7 is a data flow diagram of an embodiment of a print processor.

FIG. 7 is a data flow diagram of an embodiment of a print processor 702. It is to be understood that the print processor 702 shown in FIG. 7 is only one possible embodiment out of many and is meant for illustrative purposes only. The print processor 702 may include a PDL parser 704. A PDL parser 704 is a language parser that parses the page description language (PDL) format of the print data. For example, PCL 5, PCL XL, Postscript and PDF. The output would be an internal representation of the print data (IR) 706.

The print processor 702 may also include a page splitter 708. A page splitter 708 operates to partition the IR data 706 into logical pages 710.

The print processor 702 may also include a page reassembler 712. A page reassembler 712 reorders the logical pages 710 based on the booklet ordering and the specified booklet grouping.

The print processor 702 may also include a page placer 714. The page placer 714 is a component that rescales and positions the logical pages on physical sheets. The page placer 714 may be used if the printer does not support scale/placement for booklet printing in the firmware.

A print job reassembler 716 may also be included in the print processor 702. A print job reassembler 716 converts the booklet IR data 718 back into PDL data and reassembles the PDL data into a print job with separate RIPs per booklet which a controller 720 sends to the print subsystem 722.

Figure 8:
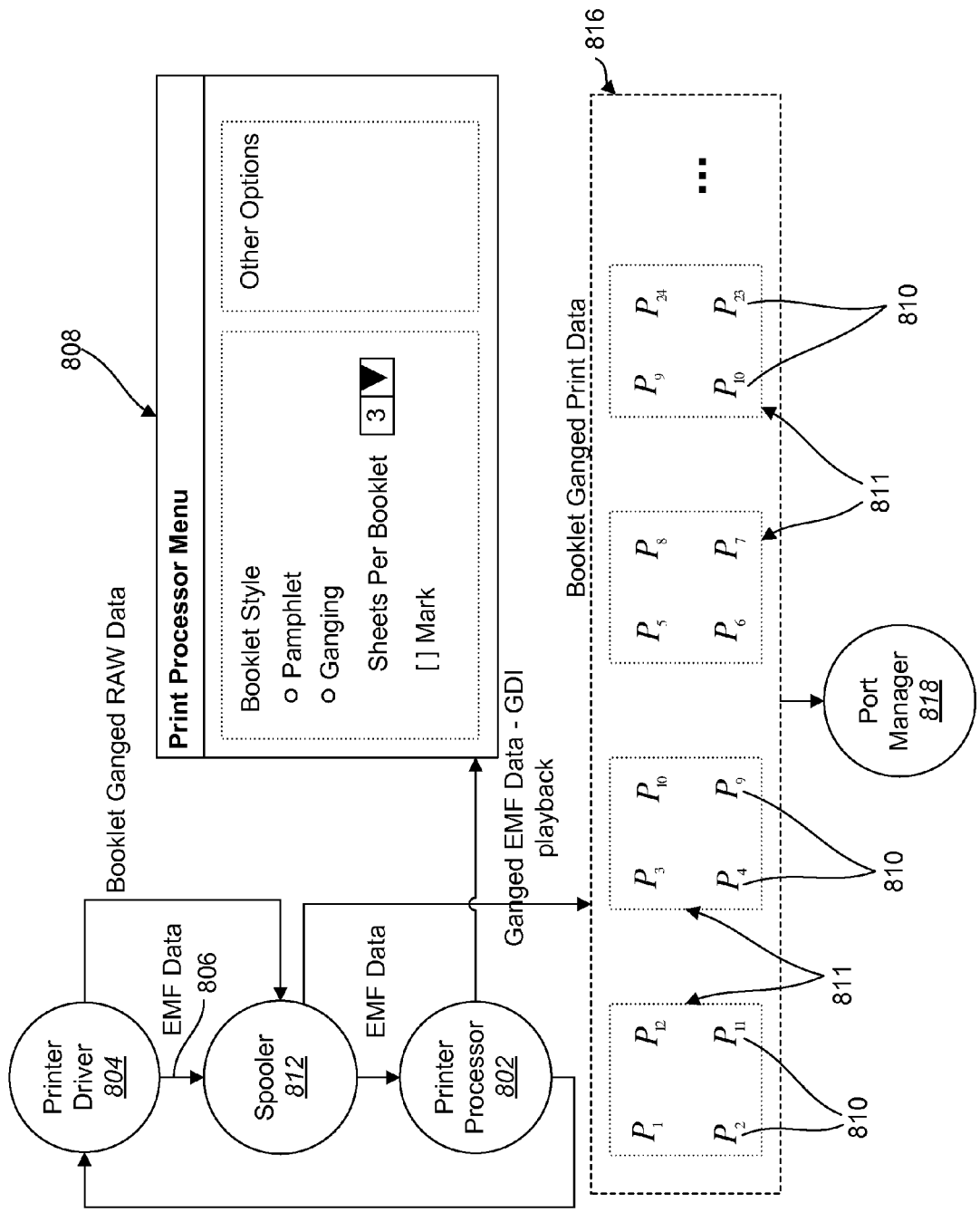
FIG. 8 is another embodiment of a booklet ganging software component that is print processor based.
Figure 9:
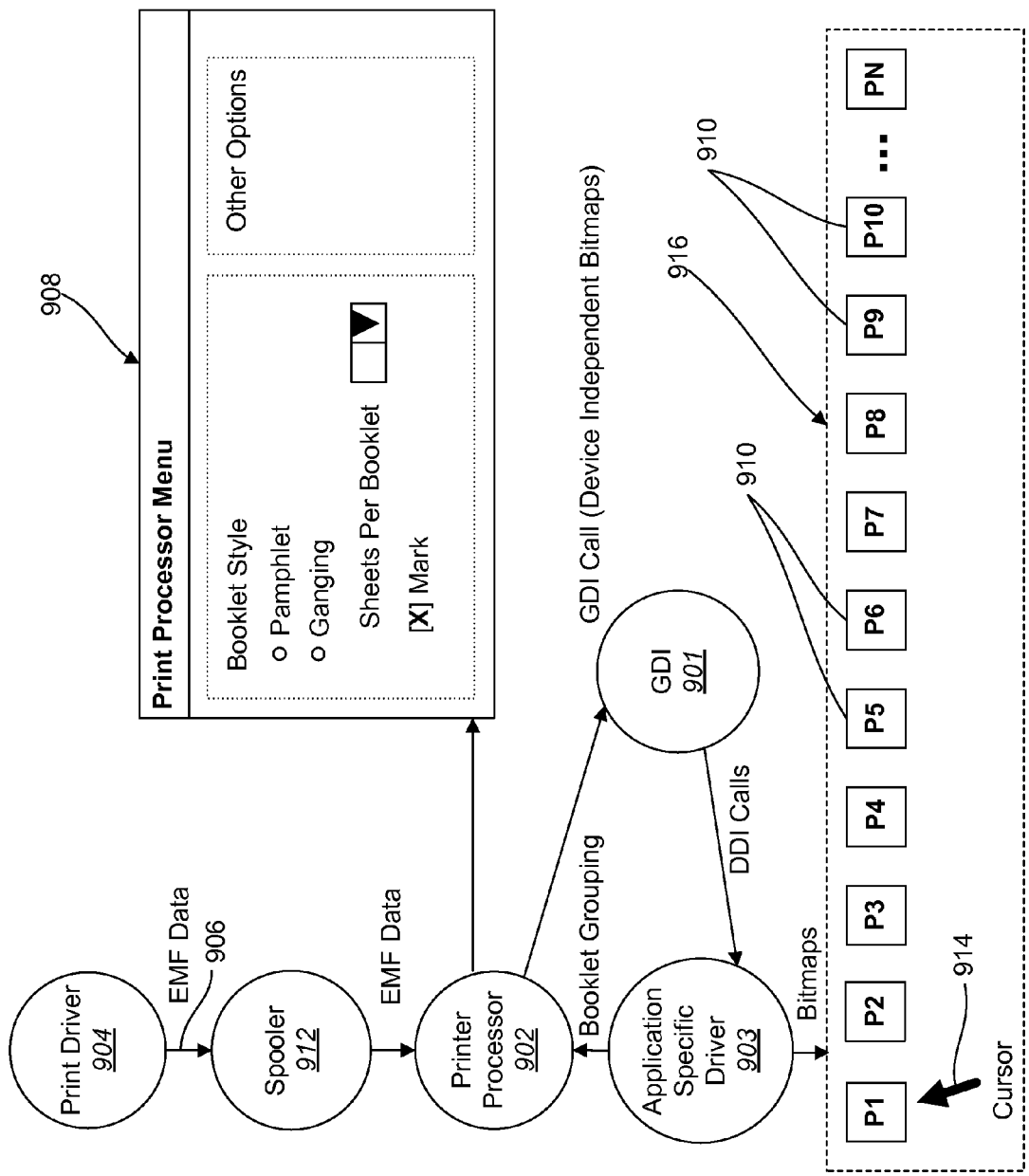
FIG. 9 is a further embodiment of a booklet ganging software component that is print processor based.

In other embodiments, the print data has been journaled, hereafter referred to as EMF data. FIGS. 8 and 9 are block diagrams illustrating an embodiment of a booklet ganging component 208 that is print processor based and that features EMF data. FIG. 8 is an embodiment directed toward fixed size sets and FIG. 9 is an embodiment directed toward variable sized sets.

EMF data is where the printing instructions are saved without interpretation/rendering for deferred rendering. EMF (i.e., Enhanced Metafile Format) is the standard journal format for printing in the Microsoft Windows® family of operating systems.

The printer driver 804 provides EMF data 806 to the spooler 812. The spooler processes the EMF data 806. Once the grouping of booklets is determined, the print processor 802 reassembles the pages into booklet ordering for the specific booklet grouping. Each booklet 811 would be treated as a separate RIP, as described earlier. The booklet ganged EMF data would then be played back to the respective printer driver 804 for subsequent rendering and spooling to the spooler 812 and then printing to the printing device or saved as a print data file for deferred printing.

FIG. 9 also illustrates the use of GDI 901. The print processor 902 provides printing instructions to the GDI 901 which outputs DDI calls to the application specific driver 903. The booklet groupings may be fed back to the print processor 902.

To accomplish the operation described in relation to FIGS. 8 and 9, the print processor may have additional functionality. The print processor 802, 902 may include an EMF parser (not shown). The EMF parser parses the printing instructions of the journaled format. For example, EMF in MS operating systems. The output would be an internal representation of the EMF data (IR).

The print processor 802, 902 may also include a page splitter 708. A page splitter 708 is a page separator that partitions the IR data into logical pages and was discussed in relation to FIG. 7.

The print processor 802, 902 may also include a page reassembler 712. The page reassembler 712 reorders the logical pages based on the booklet ordering and the specified booklet grouping and was discussed in relation to FIG. 7.

The print processor 802, 902 may also include a page placement component (not shown). A page placement component is an optional component that rescales and positions the logical pages on physical sheets. If the respective printer firmware does not support scale/placement for booklet printing, this component may be used. Otherwise, this component may not be needed.

A print job reassembler 716 may also be included in the print processor 802, 902. The print job reassembler 716 converts the booklet IR data back into EMF data and reassembles the EMF data into a print job with separate RIPs per booklet. The print job reassembler 716 was discussed in relation to FIG. 7.

Figure 10:
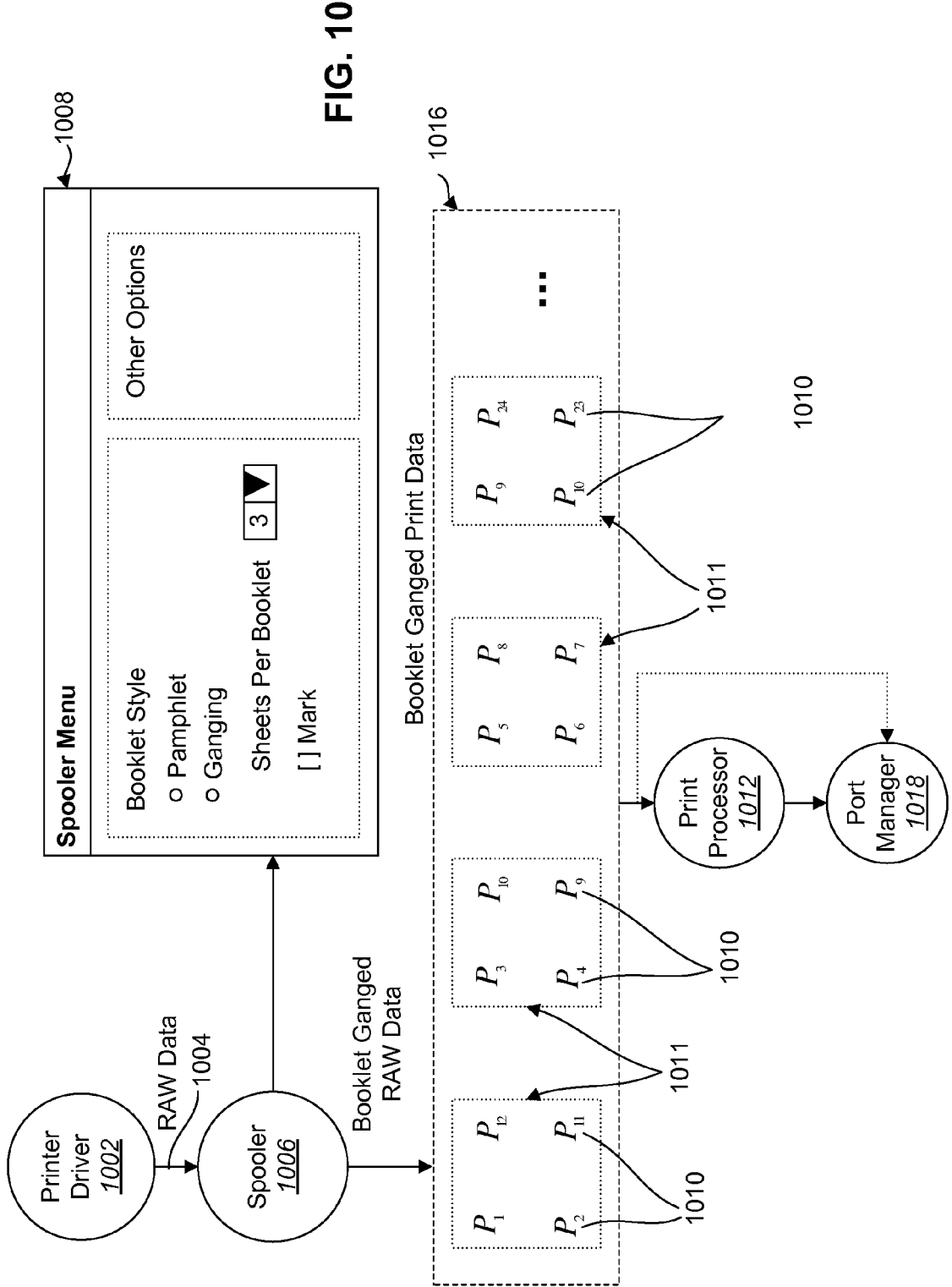
FIG. 10 is a block diagram illustrating an embodiment of a booklet ganging software component that is spooler based.

As mentioned above, the booklet ganging software component 208 may be print driver based or it may be print processor based. The booklet ganging component 208 may also be spooler based. FIG. 10 is a block diagram illustrating an embodiment of a booklet ganging component 208 that is spooler based. Further, the embodiment of FIG. 10 illustrates RAW mode. A printer driver 1002 provides RAW data 1004 to the spooler 1006. In this embodiment, the spooler component 1006 of the print subsystem has the capability to specify booklet ganging for book printing, specify the grouping of booklets and/or generate a RIP/assembly per booklet for printing.

In this embodiment, the spooler 1006 displays a spooler menu 1008 for selecting booklet 1011 ganging and booklet grouping options, as described above. In another embodiment, the spooler is non-interactive, and the selection of booklet ganging and booklet grouping is obtained by the methods described above. The print processor 1012 receives the booklet ganged print data 1016 and provides it 1016 to the port manager 1018.

If the selection of grouping is variable sized and the selection of options is interactive, the spooler 1006 could display a preview of the pages, as described above.

Figure 11:
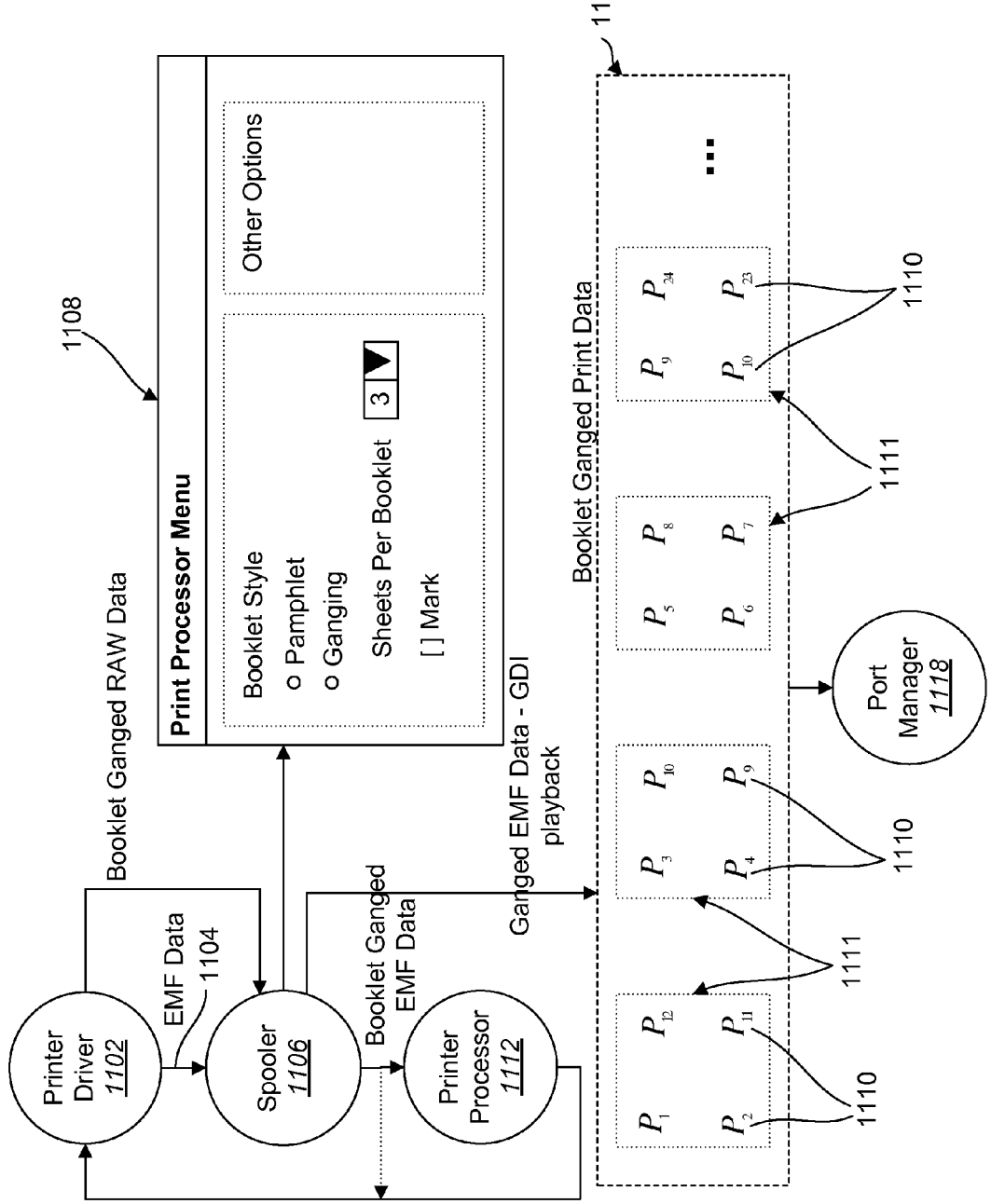
FIG. 11 is a block diagram illustrating another embodiment of a booklet ganging software component that is spooler based.

FIG. 11 is a block diagram illustrating an embodiment of a booklet ganging component 208 that is spooler based. Further, the embodiment of FIG. 11 illustrates EMF mode.

The spooler 1006, 1106 handles the processing of the RAW or EMF data into booklet ganged data in the methods described above for the print processor with the following modifications. Relating to RAW mode, the spooler 1006, 1106 may optionally write the booklet ganged RAW data directly to the printing device, instead of the print processor 1012. Relating to EMF mode, the spooler 1006, 1106 may defer the playback of the booklet ganged EMF data to the print processor 1112.

Figure 12:
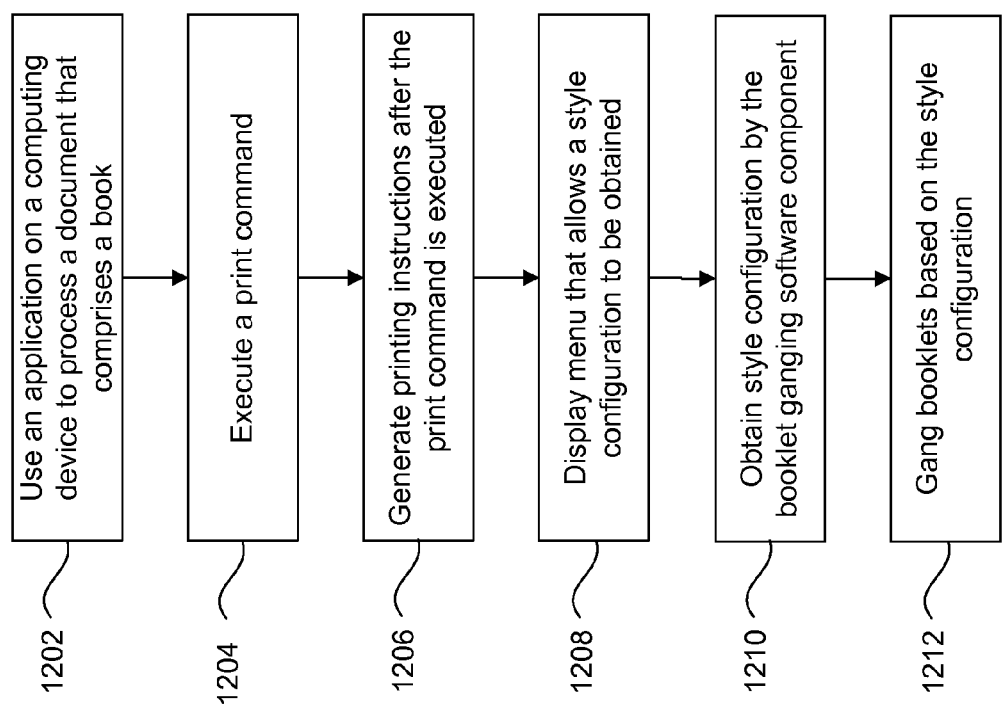
FIG. 12 is a general flow diagram of a method for an embodiment of a booklet ganging software component.

FIG. 12 is a general flow diagram of a method for an embodiment of a booklet ganging software component 208. The method enables the printing of a book through the use of booklet ganging. A user typically uses 1202 an application on a computing device to process a document that comprises a book. The user executes 1204 a print command in the application. Printing instructions are generated 1206 by the application after the print command is executed.

A menu may be displayed 1208 that allows a style configuration to be obtained. The style configuration is obtained 1210 after the print command is executed and it includes an indication of whether the document is to be ganged. The style configuration is not obtained by the application but is obtained by the booklet ganging software component. In another embodiment the style configuration may be obtained by a port manager.

The booklets are then ganged 1212 based on the style configuration if the indication indicates that the document is to be ganged. The ganging of booklets may include specifying the booklet ganging for book printing, specifying booklet groupings and generating a Raster Image Processor (RIP)/assembly per booklet for printing. Finally, the book is printed on the printer.

Those skilled in the art will appreciate that the present systems and methods may be implemented in many different embodiments. Other embodiments include but are not limited to the spooling and despooling subsystems of the Apple MacIntosh operating system, the Linux operating system, System V Unix operating systems, BSD Unix operating systems, OSF Unix operating systems, and IBM Mainframe MVS operating system.

The systems and methods herein may also be implemented by a print assist, which is any component added to the existing print subsystem between the printer driver and port manager. In addition, they also may be implemented by the port manager and incorporated in the printing protocol.

This invention could also be applied to the ganging of more complex folding, such as tri-folds and other multiple folding and page-per-sheet techniques.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for printing a book through use of booklet ganging, the method comprising:
   causing a menu to be displayed that allows a style configuration to be obtained;
   obtaining the style configuration after a print command has been executed by an application, wherein the style configuration includes an indication of whether the document is to be ganged, and wherein the style configuration is not obtained by the application;
   ganging booklets based on the style configuration if the indication indicates that the document is to be ganged, wherein a print processor generates booklet ganged print data, and wherein the print processor comprises:
      a Page Description Language (PDL) parser for parsing print data;
      a page splitter for generating logical pages;
      a page reassembler for reordering the logical pages based on a booklet ordering and a specified booklet grouping; and
      a print job reassembler for converting booklet data into PDL data and for reassembling the PDL data into a print job with separate Raster Image Processed (RIP) data per booklet; and
   printing the book through use of the booklet ganging.

2. The method of claim 1, wherein the print command comprises a print/fax command.

3. The method of claim 1, wherein the style configuration is obtained by program instructions selected from the group consisting of printer driver instructions, fax driver instructions, print processor instructions, print assist instructions, port manager instructions and spooler instructions.

4. The method of claim 1, further comprising assembling pages of the book after printing instructions are passed through a Graphical Device Interface (GDI).

5. The method of claim 1, wherein each booklet is treated as separate Raster Image Processed (RIP) data.

6. The method of claim 1, further comprising:
   specifying booklet ganging for book printing;
   specifying booklet groupings; and
   generating a Raster Image Processed (RIP)/assembly per booklet for printing.

7. The method of claim 1, further comprising generating printing instructions by the application after the print command is executed.

8. A system for printing a book through use of booklet ganging, the system comprising:
   a computer connected to a printer;
   a document accessible on the computer, the document being compatible with an application running on the computer; and
   a software component on the computer, wherein the software component is configured to:
      cause a menu to be displayed that allows a style configuration to be obtained;
      obtain the style configuration after a print command has been executed by an application, wherein the style configuration includes an indication of whether the document is to be ganged, and wherein the style configuration is not obtained by the application;

gang booklets based on the style configuration if the indication indicates that the document is to be ganged, wherein a print processor generates booklet ganged print data, and wherein the print processor comprises:
- a Page Description Language (PDL) parser for parsing print data;
- a page splitter for generating logical pages;
- a page reassembler for reordering the logical pages based on a booklet ordering and a specified booklet grouping; and
- a print job reassembler for converting booklet data into PDL data and for reassembling the PDL data into a print job with separate Raster Image Processed (RIP) data per booklet; and print the book through use of the booklet ganging.

9. The system of claim 8, wherein the printer comprises a facsimile device and wherein the print command comprises a print/fax command.

10. The system of claim 8, wherein the software component comprises a printer driver or a fax driver.

11. The system of claim 8, wherein the software component comprises a print processor.

12. The system of claim 8, wherein the software component comprises a spooler.

13. The system of claim 8, wherein the software component comprises a port manager.

14. The system of claim 8, wherein the software component comprises a print assist.

15. A computer-readable medium for storing program data, wherein the program data comprises executable instructions for printing a book through use of booklet ganging, the instructions being executable to:
- cause a menu to be displayed that allows a style configuration to be obtained;
- obtain the style configuration after a print command has been executed by an application, wherein the style configuration includes an indication of whether the document is to be ganged, and wherein the style configuration is not obtained by the application;
- gang booklets based on the style configuration if the indication indicates that the document is to be ganged, wherein a print processor generates booklet ganged print data, and wherein the print processor comprises:
  - a Page Description Language (PDL) parser for parsing print data; and
  - a page splitter for generating logical pages; and print the book through use of the booklet ganging.

16. The computer-readable medium of claim 15, wherein the program data comprises a printer or fax driver.

17. The computer-readable medium of claim 16, wherein the printer driver or a fax driver receives DDI calls from Graphical Device Interface (GDI) calls produced by the print processor.

* * * * *